United States Patent

[11] 3,545,535

[72] Inventor Harold A. Hinkens
3343 E. Van Norman Ave., Cudahy,
Wisconsin 53110

[21] Appl. No. 766,430
[22] Filed Oct. 10, 1968
[45] Patented Dec. 8, 1970

[54] STUD MOUNTED DIODE
3 Claims, 6 Drawing Figs.

[52] U.S. Cl. ........................ 165/80, 165/186
[51] Int. Cl. ........................ F28f 7/00
[50] Field of Search ........................ 165/47, 80, 185, 186, (Elec. Digest); 317/234.1

[56] References Cited
UNITED STATES PATENTS

| | | | |
|---|---|---|---|
| 3,152,293 | 10/1964 | Ruben .......................... | 317/234 |
| 3,435,891 | 4/1969 | Parrish .......................... | 165/80 |

*Primary Examiner*—Charles Sukalo
*Attorney*—Clarence A. O'Brien & Harvey B. Jacobson

ABSTRACT: A component housing including an electronic element enclosed within a jacket which mounts a stud extending therefrom. The stud includes an integrally attached fastener head disposed in coaxial spaced relation to said jacket. The stud has a spacing shank portion, intermediate the jacket and fastener head, which includes a heat radiating surface thereon.

Harold A. Hinkens
INVENTOR.
BY Clarence A. O'Brien and Harvey B. Jacobson
Attorneys

STUD MOUNTED DIODE

The present invention to semiconductor devices and more particularly to stud mounted housings therefor.

The prior art includes many forms of semiconductor housings for mounting active elements, used particularly for high current applications. One face of a semiconductor material is soldered or welded to a head of a threaded mounting stud constituting an electrical terminal of the device. A terminal wire or metal pin is soldered to the opposite face of the active element thus constituting another electrical terminal of the device. A cylindrical metal sleeve is attached along an annular flange portion to the head of the stud and a seal of insulating material is contained within the sleeve through which the terminal wire or pin extends, resulting in the commonly referred to "top hat" construction. The advantage of this type of construction resides in the fact that there is direct contact between one face of the active element and the head of the mounting stud. Therefore, heat generated in the active element can be conducted into a heat sink, such as a metal support on which the device is mounted by means of a threaded shank portion on the stud.

Further, it is well known that lack of reliability in semiconductor devices is in part affected by mechanical strains imposed on an active element caused by mounting methods currently utilized. Specifically, devices such as stud mounted diodes, transistors, silicon controlled rectifiers and the like may be over-tightened when assembled. The assembly forces induce strain in that portion of the device immediately supporting a respective active element. This in turn causes strain or rupture of the crystalline element structure and commensurate deviation in operating characteristics or complete failure of the element. To combat this, manufacturers prescribe maximum torques for assembling stud mounting nuts. This, however, is subject to human error in the assembly process and often results in failure or inefficiency of the device. Because this type of failure may not become immediately apparent, failure thereof at a future time may result in inoperability of major equipment necessitating expensive debugging and testing. In this respect, it is noted that vibration and thermal expansion and contraction during equipment operation may bring crystal destruction to fruition at an inopportune time.

In accordance with the present invention, the mounting surface for the semiconductor element is isolated from strains ordinarily imposed thereon when tightening the stud assembly nut. This is accomplished by forming the mounting stud with a clamping head abutting the mounting plate spaced from a flange on which the element mounting surface is formed. A gap is thereby formed between the mounting plate and the mounting flange to provide convenient means for removal of heat in the presence of air flow, which could otherwise contribute to element failure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
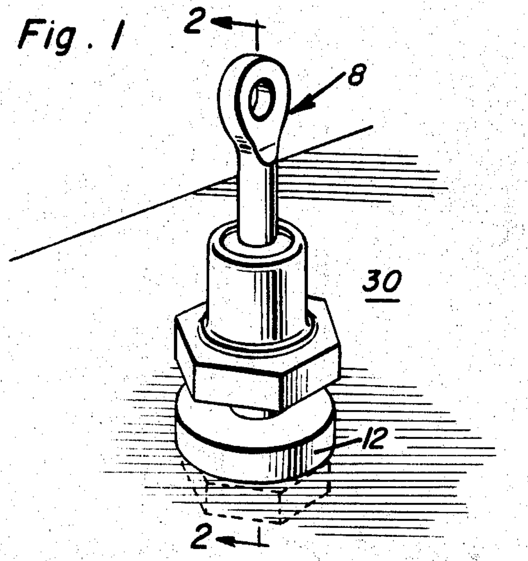
FIG. 1 is a perspective view of a first embodiment of the present invention.
Figure 3:
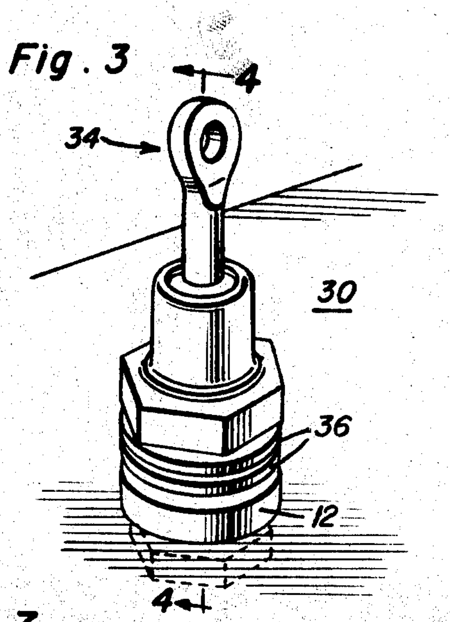
FIG. 3 is a perspective view of a second embodiment of the present invention.
Figures 2, 4, 7:
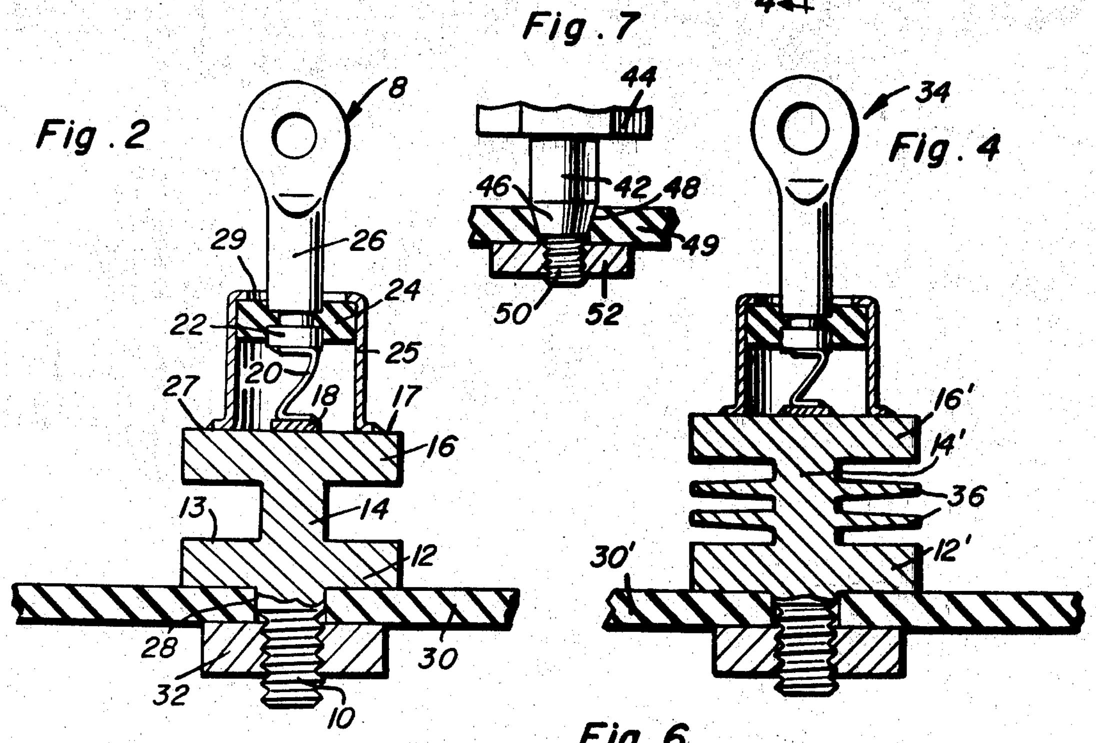
FIG. 2 is a vertical cross-sectional view taken along a plane passing through section 2–2 of FIG. 1.
FIG. 4 is a vertical cross-sectional view taken along a plane passing through section line 4–4 of FIG. 3.
FIG. 7 is a partial sectional view showing an alternate means of anchoring the invention to a mounting plate.
Figure 5:
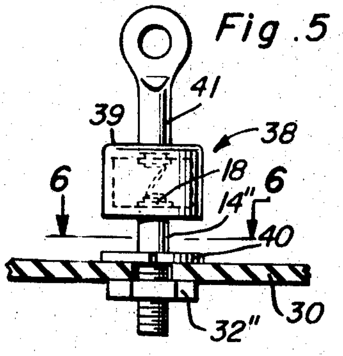
FIG. 5 is a front elevational view of a third embodiment of the present invention.

Referring specifically to the drawings, FIGS. 1, 3 and 5 illustrate three separate embodiments of an improved stud mounted electronic component to be mounted within an aperture formed in a metal plate. The first embodiment is illustrated in FIGS. 1 and 2 and is generally denoted by reference numeral 8. The device illustrated includes a threaded stud position 10 adapted for passage through an aperture in a mounting plate and secured therein as hereinafter explained. The threaded stud portion appends from a cylindrical head portion 12. The outward surface 13 of this head portion integrally mounts a medial spacing portion 14 which is in turn integrally connected to a coaxial hexagonal flange 16. The outward surface 17 of this flange suitably mounts an electronic element which by way of example may be a semiconductor crystalline or a passive element. A contact pin 22 is retained in spaced overlying relation to the element and a Z-shaped connector lead 20 connects the confronting surfaces of contact pin 22 and element 18. The shape of the lead 20 is designed to permit relatively free expansion and contraction of element 18 due to the flexing capability of lead 20. Connecting pin 22 is retained within a suitable sealing compound 24 which in turn is retained within a metal sleeve or jacket 25. The latter jacket forms an enclosure or housing for the element 18, the latter being affixed to surface 17 of hexagonal flange 16 by means of a weld or other suitable connection 27. The jacket end oppositely disposed from the flange connecting end includes an aperture 29 therein. This aperture permits passage of a terminal lug 26 therethrough, one end of this lug being retained within sealing compound 24 for electrical connection with contact pin 22. The opposite end of the lug provides an electrical connection point to the element.

As previously mentioned, the device 8 is adapted for mounting in an aperture 28 formed within a mounting plate denoted by 30. The device 8 is retained within this aperture by means of a threaded nut 32 threadingly engaged by the threaded stud portion 10. It will be appreciated that mechanical strains are isolated from element 18 because it is spaced from plate 30 and stud portion 12 by the spacing portion 14. More specifically, mechanical stresses are not transmitted to element 18 due to the spaced relation between the element supporting hexagonal flange 16 and the mounting members 12 and 32. In the preferred embodiment illustrated head portion 12 is fabricated in a right cylindrical shape rather than hexagonal as in the case of flange 16. This would preclude head portion 12 from inappropriately being used as a tightening means instead of nut 32. Further, it is noted that the hexagonal flange 16 and stud head portion 12 being maintained in spaced relation creates a passageway for circulating air therethrough. As will be appreciated, the passage or gap between confronting surfaces of the hexagonal flange and stud head portion creates an integral head sink and if desired may be filled with heat transfer material to facilitate removal of heat.

The second embodiment of the present invention is illustrated in FIGS. 3 and 4 and is denoted by reference numeral 34. This second embodiment has a similar structure as the first embodiment shown in FIGS. 1 and 2. However, the displacement between hexagonal flange 16′ and stud head portion 12′ is increased to permit the integral mounting of coaxially spaced annular radiator fins 36 from the median spacing portion 14′. It is noted that these annular fins create a more efficient radiator than a straight shank portion by creating extra radiating surfaces particularly necessary when an insulating mounting plate 30′ is utilized.

Figure 6:
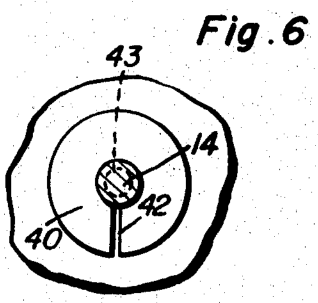
FIG. 6 is a transverse cross-sectional view taken along a plane passing through section line 6–6 of FIG. 5.

A third embodiment of the present invention employs the isolated mounting means and inherent radiator characteristics as previously explained in connection with the first embodiment of FIGS. 1 and 2. The third embodiment is denoted by reference numeral 38 and includes an element jacket or housing 39 concentrically mounted upon an intermediate portion of elongated stud 41 terminating at one outward end thereof in a terminal lug portion. The opposite end of the stud is threaded to accommodate a mounting nut 32″ in the same manner as discussed in connection with the previous embodiments. A medial spacing portion 14″ of stud 41 includes an annular groove 43 therein as shown by dotted line in FIG. 6 for accommodating a slitted washer 40 adapted to be disposed transversely of medial portion 14''. The washer includes a radial slit 42 therein to facilitate mounting of the washer in the groove. The disposition of washer 30 on medial portion 14 is clearly shown in FIG. 6. When stud 41 is mounted within an aperture formed in the metal plate 30 as shown in FIG. 5, washer 40 is retained in parallel spaced relation to threaded nut 32'' thereby completing a vising relation with the outward peripheral area around the aperture through which the stud passes. It is noted that jacket 39 and element 18 contained therein are isolated from mechanical stresses due to their spaced relation to the mounting members, namely, washer 40 and threaded mounting nut 32. Further, a passageway previously discussed with respect to the first embodiment shown in FIGS. 1 and 2 is created between the confronting surfaces of the metal housing 39 and washer 40. This passageway permits the circulation of air therethrough for effecting dissipation of heat from the jacket.

Although connection of the present invention to a plate is described in terms of threaded fastening, it will be appreciated that any suitable method of connecting the stud portion to a plate would not detract from the advantages of the present mounting arrangement.

An alternate arrangement for anchoring the present invention to a mounting plate is illustrated in FIG. 7 and is seen to include a medial spacing portion 42, similar to portion 14 shown in FIG. 2, which integrally appends from hexagonal flange 44, the latter being similar to flange 16. The spacing portion 42 includes a beveled section 48 adapted to be received in a countersunk aperture 48 formed in a mounting plate 49. A threaded stud portion 50 is axially connected to the end of the beveled section and extends outwardly through the aperture 48 for threaded fastening engagement by a nut member 52.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

I claim:

1. An electronic component to be directly received in a supporting member, the component comprising a threaded stud portion extending through the member, a head integrally attached to the stud portion and lying in contacting overlying relation with the supporting member, a fastener mounted to the stud portion for clamping the head against the support member, a medial portion integrally extending from the head, a flange transversely extending from the medial portion and integrally attached thereto in spaced relation to the head, a gap being formed between the flange and head, and a jacket mounted to the flange and enclosing an electronic element, the medial portion isolating the element from stress created at the interface between the head and the supporting member, the gap serving to dissipate generated heat from the components.

2. The structure set forth in claim 1 including radiating fins projecting laterally from the medial portion within said gap.

3. The structure set forth in claim 1 wherein the head comprises a beveled section of the stud portion to be received in a countersunk aperture in the mounting member.